US010651616B2

(12) United States Patent
Christiansen et al.

(10) Patent No.: US 10,651,616 B2
(45) Date of Patent: May 12, 2020

(54) LIGHT SOCKET ADAPTER WITH AMBIENT SENSORING MEANS

(71) Applicant: ANYWARE SOLUTIONS APS, Valby (DK)

(72) Inventors: Jan Hoffritz Christiansen, Valby (DK); Morten Bremild, Frederiksberg (DK)

(73) Assignee: ANYWARE SOLUTIONS APS, Valby (DK)

( * ) Notice: Subject to any disclaimer, the term of this patent is extended or adjusted under 35 U.S.C. 154(b) by 0 days.

(21) Appl. No.: 16/089,946

(22) PCT Filed: Mar. 22, 2017

(86) PCT No.: PCT/DK2017/050084
§ 371 (c)(1),
(2) Date: Sep. 28, 2018

(87) PCT Pub. No.: WO2017/167337
PCT Pub. Date: Oct. 5, 2017

(65) Prior Publication Data
US 2019/0115706 A1    Apr. 18, 2019

(30) Foreign Application Priority Data
Mar. 29, 2016  (DK) ................................. 2016 00184

(51) Int. Cl.
*H01R 33/945*    (2006.01)
*H05B 37/02*    (2006.01)
(Continued)

(52) U.S. Cl.
CPC ......... *H01R 33/9453* (2013.01); *F21V 23/06* (2013.01); *H01R 33/90* (2013.01);
(Continued)

(58) Field of Classification Search
CPC .... H01R 33/90; H01R 33/94; H01R 33/9453; H01R 2201/20; F21V 23/06; H05B 37/0272; Y02B 20/19
See application file for complete search history.

(56) References Cited

U.S. PATENT DOCUMENTS 1,727,150 A * 9/1929 White ..................... F21V 17/00
                                              362/448
2,605,389 A * 7/1952 Kimball ............... F21V 29/004
                                              362/414
(Continued)

FOREIGN PATENT DOCUMENTS

WO    2007072296 A1    6/2007

OTHER PUBLICATIONS

PCT: International Search Report and Written Opinion of PCT/DK2017/050084; dated Aug. 6, 2017; 10 pgs.

*Primary Examiner* — Oscar C Jimenez
(74) *Attorney, Agent, or Firm* — Gregory M. Howison

(57) ABSTRACT

The present invention relates to a light socket adapter comprising a housing having a base portion mounted centrally with an extended coupling mechanism designed for insertion into an electrical light socket support, a peripheral outer wall portion extending in a distance from the base portion to an end portion, the end portion centrally arranged with a recessed coupling mechanism designed for receiving a light bulb; the housing having an inner protective wall portion that substantially surrounds and is in close proximity with the inner surface of the recessed coupling mechanism; the peripheral outer wall portion and inner protective wall portion defining an inner chamber of the housing comprising at least one circuit board including at least one microprocessor, at least one receiver and at least one transmitter; the inner chamber of the housing comprises one or more ambient sensoring means.

20 Claims, 8 Drawing Sheets

(51) Int. Cl.
*F21V 23/06* (2006.01)
*H01R 33/90* (2006.01)
*H01R 33/94* (2006.01)

(52) U.S. Cl.
CPC ......... *H01R 33/94* (2013.01); *H05B 37/0272* (2013.01); *H01R 2201/20* (2013.01); *Y02B 20/19* (2013.01)

(56) References Cited

U.S. PATENT DOCUMENTS

| | | | | |
|---|---|---|---|---|
| 3,379,871 | A * | 4/1968 | Peek, Jr. | H01R 33/9453 338/70 |
| 3,452,215 | A * | 6/1969 | Alessio | H01R 33/94 307/146 |
| 3,893,019 | A * | 7/1975 | King | G05F 1/445 315/194 |
| 4,101,805 | A * | 7/1978 | Stone | F21V 19/006 200/600 |
| 4,503,360 | A * | 3/1985 | Bedel | H01J 61/34 313/19 |
| 4,654,541 | A * | 3/1987 | Angott | H01R 33/945 200/51.14 |
| 5,121,287 | A | 6/1992 | Lee | |
| 5,356,314 | A * | 10/1994 | Aota | H01R 33/94 439/642 |
| 5,432,500 | A * | 7/1995 | Scripps | G08B 17/10 340/12.32 |
| 5,458,505 | A * | 10/1995 | Prager | F21V 19/006 439/485 |
| 5,634,820 | A * | 6/1997 | Vakil | F21S 8/00 313/318.01 |
| 5,738,436 | A * | 4/1998 | Cummings | F21S 8/026 362/294 |
| 6,093,983 | A | 7/2000 | Singh | |
| 6,400,968 | B1 * | 6/2002 | White | G08C 17/02 455/572 |
| 6,582,253 | B1 * | 6/2003 | Lau | H01R 31/065 439/232 |
| 7,079,808 | B2 | 7/2006 | Striemer | |
| 8,328,582 | B1 | 12/2012 | Carley et al. | |
| 10,154,571 | B2 * | 12/2018 | Lai | H05B 37/0272 |
| 2005/0104524 | A1 * | 5/2005 | Bishop | F21V 23/02 315/56 |
| 2005/0164630 | A1 * | 7/2005 | Kates | G08B 1/08 455/11.1 |
| 2005/0185396 | A1 * | 8/2005 | Kutler | F21V 29/004 362/218 |
| 2008/0316047 | A1 * | 12/2008 | De Goederen-Oei | H05B 37/0272 340/13.24 |
| 2008/0318521 | A1 | 12/2008 | Kates | |
| 2010/0060130 | A1 * | 3/2010 | Li | F21V 29/773 313/46 |
| 2012/0051056 | A1 * | 3/2012 | Derks | F21V 15/01 362/257 |
| 2012/0171904 | A1 * | 7/2012 | Chen | H01R 33/22 439/661 |
| 2014/0021864 | A1 * | 1/2014 | Liao | H01R 33/94 315/133 |
| 2014/0084165 | A1 * | 3/2014 | Fadell | G08B 17/00 250/340 |
| 2014/0268697 | A1 * | 9/2014 | Smith | F21S 9/022 362/183 |
| 2015/0233558 | A1 * | 8/2015 | Ticktin | F21V 21/22 362/404 |
| 2015/0305125 | A1 | 10/2015 | Chen | |
| 2015/0366039 | A1 | 12/2015 | Noori et al. | |
| 2016/0056971 | A1 * | 2/2016 | Kazanchian | H05B 37/0272 340/4.3 |
| 2016/0088693 | A1 * | 3/2016 | Zhao | H05B 33/0818 315/51 |
| 2016/0198553 | A1 * | 7/2016 | Fathollahi | H05B 37/0272 315/291 |
| 2017/0023225 | A1 * | 1/2017 | Chen | F21V 23/06 |

* cited by examiner

LIGHT SOCKET ADAPTER WITH AMBIENT SENSORING MEANS

CROSS-REFERENCE TO RELATED APPLICATIONS

This application is a U.S. National Phase application submitted under 35 U.S.C. § 371 of Patent Cooperation Treaty application serial no. PCT/DK2017/050084, filed Mar. 22, 2017, and entitled LIGHT SOCKET ADAPTER WITH AMBIENT SENSORING MEANS, which application claims priority to Denmark patent application serial no. PA 201600184, filed Mar. 29, 2016.

Patent Cooperation Treaty application serial no. PCT/DK2017/050084, published as WO2017167337, and Denmark patent application serial no. PA 201600184, are incorporated herein by reference.

TECHNICAL FIELD

The present invention relates to the field of light socket adapters, and more specifically to light socket adapters with internal sensoring means that monitors conditions outside the light socket adapter.

BACKGROUND

Wireless communication becomes increasingly widespread in places such as office buildings and private homes. While the signal for wireless communication is often proportionate with the requirements, there will be situations where the signal for wireless communication is limited or otherwise disrupted.

Various devices have been presented in the prior art that seek to solve this problem. Such a device is for instance found in U.S. Pat. No. 7,079,808. Here, there is provided a wireless light socket device that extends the signal to more remote places of office buildings or homes.

One of the problems with the wireless light socket devices in the prior art, however, is that they are large in size and too bulky to work properly with existing light sockets and lamps. The large construction may for instance be a problem for proper mounting due to limited space or physical interactions between the wireless devices and the light sockets or lamps.

In addition, it is apparent that wireless functionality for the light socket adapters in the prior art would be a challenge to encompass in a relatively small light socket adapter. This may partly be due to the number of components required in a light socket adapter with wireless functionality, and partly be due to the required size of the circuit board holding these components.

Particularly, it is apparent from the prior art that it would be a challenge to including internal ambient sensoring means in wireless light socket adapters with a relatively small size that monitors conditions outside the light socket adapter.

Hence, another problem with the wireless light socket devices in the prior art is that they would require enough internal volume to work with extended wireless functionality.

Furthermore, even without wireless functionality, one of the problems in the prior art light socket adapters is to properly include internal ambient sensoring means that monitors conditions outside the light socket adapter.

SUMMARY

In a first aspect, the present invention pertains to a light socket adapter comprising a housing having a base portion mounted centrally with an extended coupling mechanism designed for insertion into an electrical light socket support, a peripheral outer wall portion extending in a distance from the base portion to an end portion, the end portion centrally arranged with a recessed coupling mechanism designed for receiving a light bulb; the housing having an inner protective wall portion that substantially surrounds and is in close proximity with the inner surface of the recessed coupling mechanism; the peripheral outer wall portion and inner protective wall portion defining an inner chamber of the housing comprising at least one circuit board including at least one microprocessor, at least one receiver and at least one transmitter; the inner chamber of the housing comprises one or more ambient sensoring means.

In a second aspect, the present invention pertains to an integrated system for connectivity control, comprising a light socket adapter; at least one computing device wirelessly coupled to the light socket adapter; and optionally at least one remote server system.

The foregoing and other features and advantages of the invention will be apparent from the following more particular description of preferred embodiments of the invention, as illustrated in the accompanying drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION

Accordingly, there has been provided a light socket adapter comprising a housing having a base portion mounted centrally with an extended coupling mechanism designed for insertion into an electrical light socket support, a peripheral outer wall portion extending in a distance from the base portion to an end portion, the end portion centrally arranged with a recessed coupling mechanism designed for receiving a light bulb; the housing having an inner protective wall portion that substantially surrounds and is in close proximity with the inner surface of the recessed coupling mechanism; the peripheral outer wall portion and inner protective wall portion defining an inner chamber of the housing comprising at least one circuit board including at least one microprocessor.

In the following section reference will now be made in detail to the embodiments of the invention with reference to the figures. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. As will be understood by one of ordinary skill in the art, the present invention may be practiced without these specific details. In other instances, well-known methods, procedures, components, and circuits have not been described in detail as to not unnecessarily obscure aspects of the present invention.

Hence, the embodiments of the figures are not limiting to the invention as a whole, but are exemplified in order to provide at least one way to carry out the invention. Embodiments in the following section may be combined with other embodiments in the application as a whole and subsequently still be within the scope of the present invention.

Figure 1:
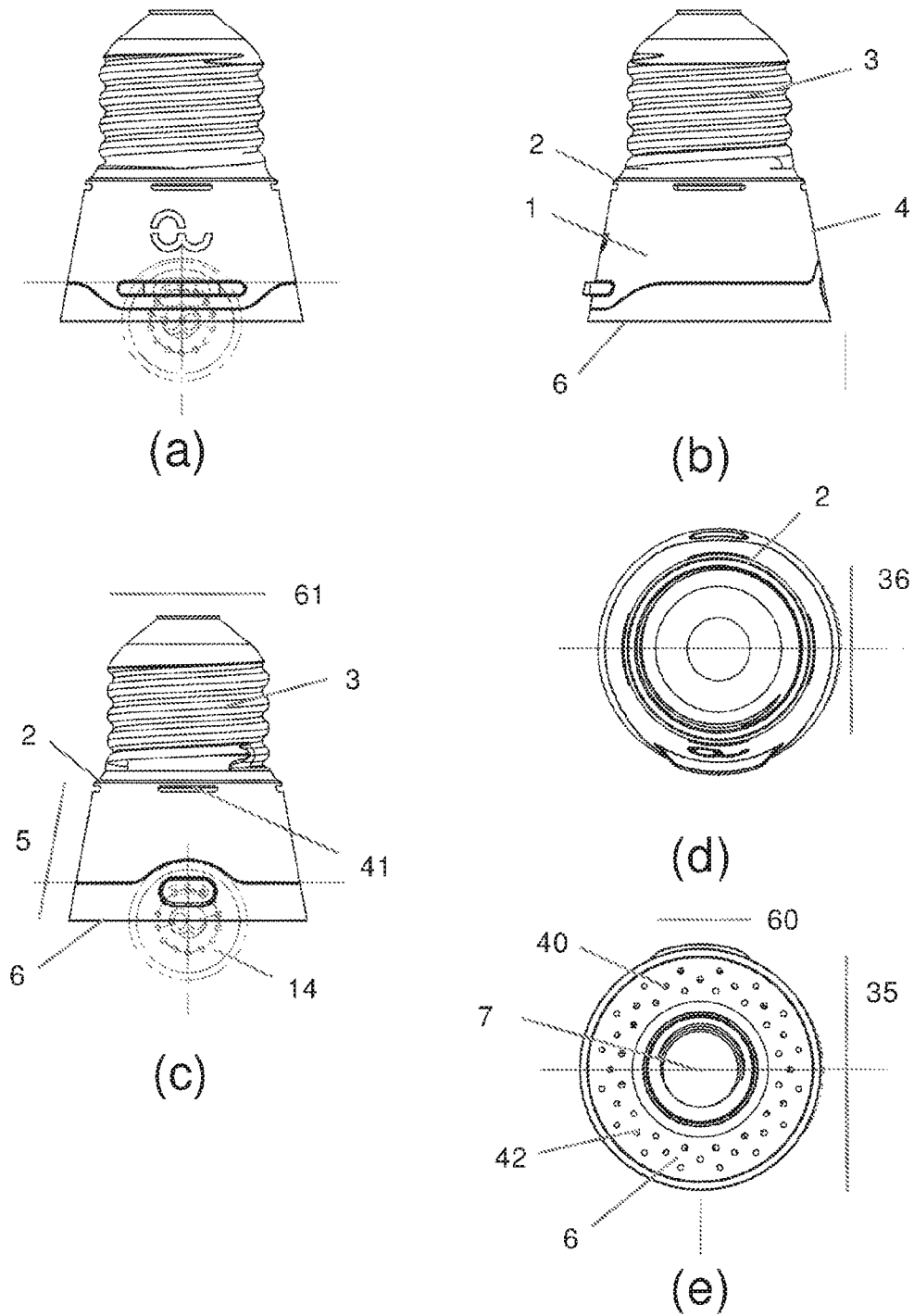
FIG. 1: A light socket adapter seen from the front (a), a light socket adapter seen from the right side (b), a light socket adapter seen from the back (c), a light socket adapter seen from the top (d) and a light socket adapter seen from the bottom (e).
Figure 2:
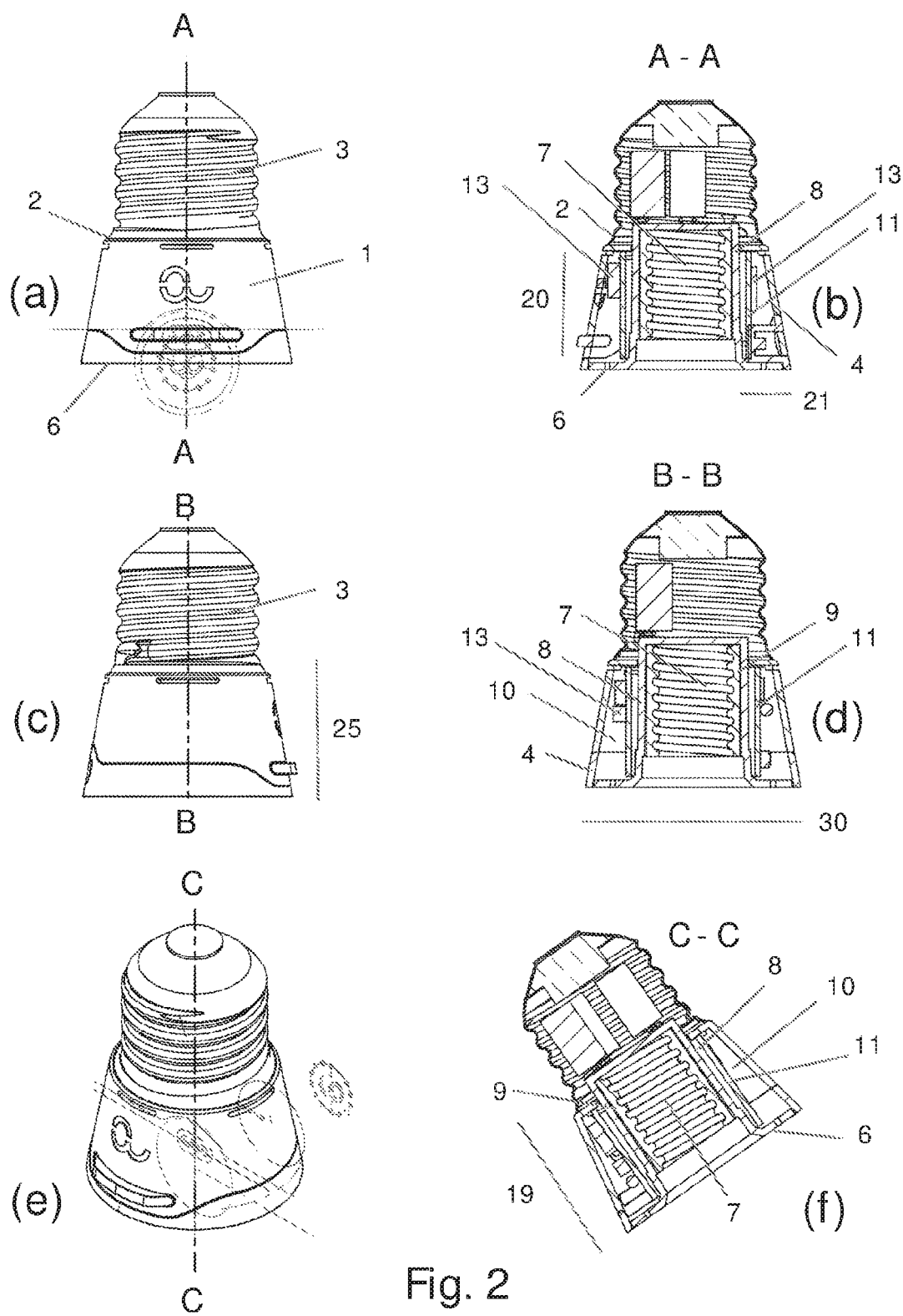
FIG. 2: A light socket adapter seen from the front where the stipulated line indicates an A to A cross-section (a), a light socket adapter in an A to A cross-section (b), a light socket adapter seen from the left side where the stipulated line indicates a B to B cross-section (c), a light socket adapter in a B to B cross-section (d), a light socket adapter seen from an upper angle in a front to right side view where the stipulated line indicates a C to C cross-section (e), and a light socket adapter in a C to C cross-section (f).
Figure 6:
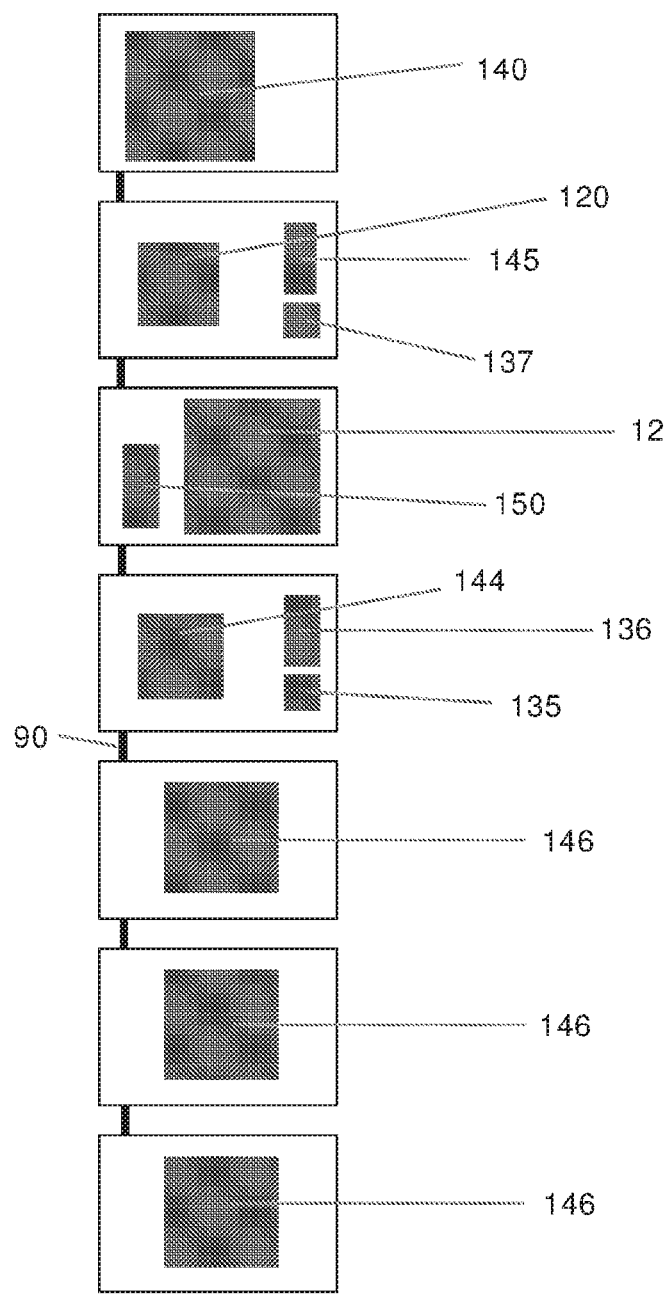
FIG. 6: A circuit board of the light socket adapter, which has been taken out of the light socket adapter for illustration purposes, seen in an outfolded position.
Figure 7:
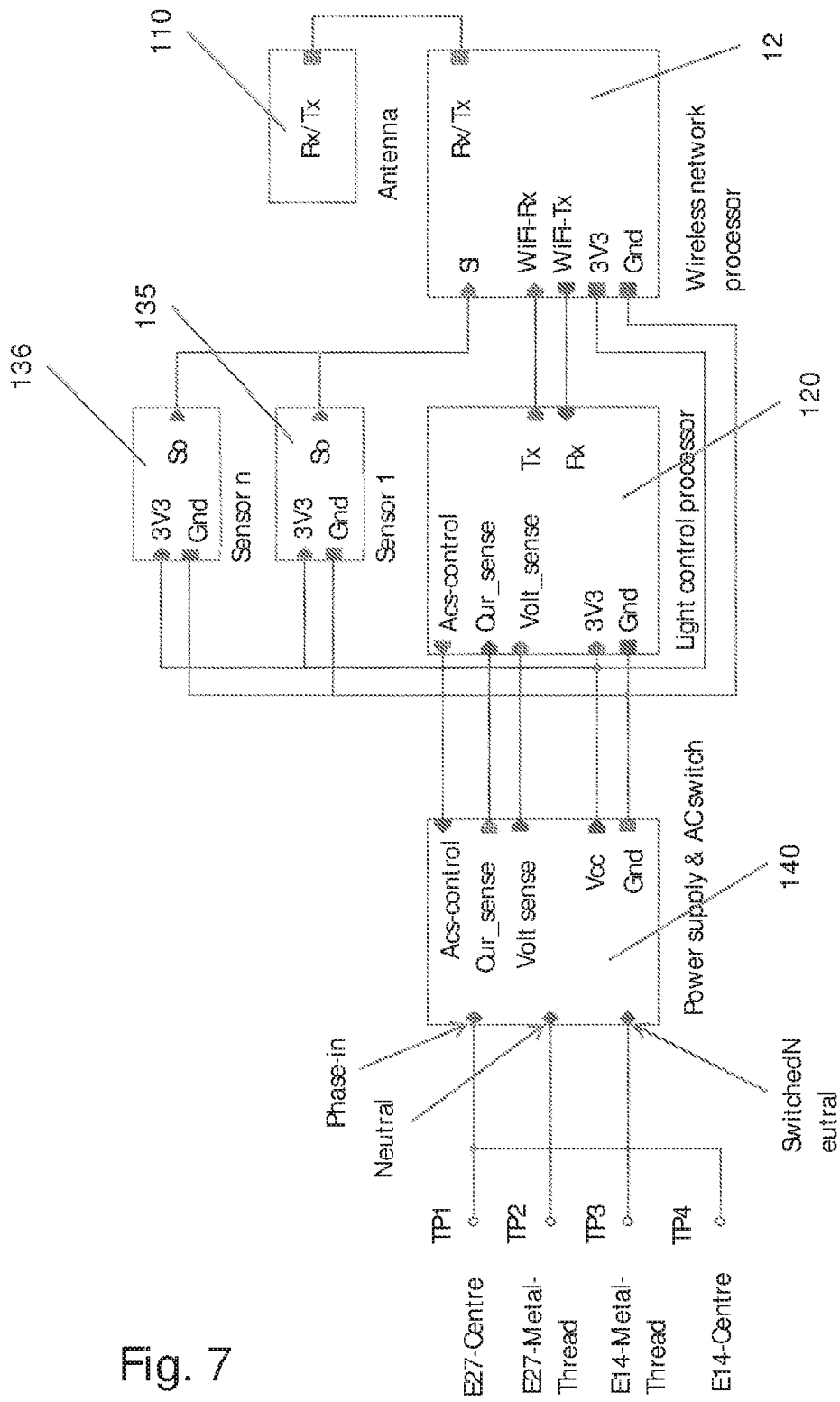
FIG. 7: A Diagram of the circuits on the circuit board in the light socket adapter.

Turning now to FIG. 1 and FIG. 2, there is shown a light socket adapter comprising a housing (1) having a base portion (2) mounted centrally with an extended coupling mechanism designed for insertion into an electrical light socket support (3), a peripheral outer wall portion (4) extending in a distance (5) from the base portion (2) to an end portion (6), the end portion centrally arranged with a recessed coupling mechanism designed for receiving a light bulb (7); the housing having an inner protective wall portion (8) that substantially surrounds and is in close proximity with the inner surface (9) of the recessed coupling mechanism (7); the peripheral outer wall portion (4) and inner protective wall portion (8) defining an inner chamber (10) of the housing comprising at least one circuit board (11) including at least one microprocessor (12—shown in FIG. 6 and FIG. 7).

With the present invention, several advantages may be achieved compared to the light socket adapters known in the prior art. The design and construction may for instance allow for a much smaller light socket adapter than seen in the prior art. Both with respect to volume, width or length of the light socket adapter, the present invention contributes significantly to the improvement of the art within the field of light sockets adapters. Combined with extended functionality, such as wireless functionality or sensoring properties, the light socket adapter of the present invention is in general terms considered a highly surprising contribution to the prior art.

One of the advantages of the inner protective wall portion (8) is that electrical components (13) in the circuit board (11) may be protected against harmful conditions, such as heat or electrical interference. When the volume of the light socket adapter is relatively small, these conditions were seen to be critical. In fact, the conditions were seen to be surprisingly more critical than expected by the inventors of the present invention.

The inner protective wall portion (8) as exemplified in the figures is 1.2 mm thick. However, the inner protective wall may in some embodiments be more than 1.0 mm thick and up to 2.5 mm thick.

When the inner protective wall portion (8) is mentioned to "substantially surround" the inner surface (9) of the recessed coupling mechanism (7), the meaning is that it extends all the way around the recessed coupling mechanism (7), except for connection openings or the like through the inner protective wall (8), and that it extends in the length (19) of the recessed coupling mechanism (7). With the term "close proximity" with the inner surface (9) of the recessed coupling mechanism (7), the understanding is that the inner protective wall portion (8) is placed within millimeters from the recessed coupling mechanism (7), preferably directly up to the recessed coupling mechanism. In an embodiment of the invention, the inner protective wall portion (8) is shaped in a polygon, such as a polygon with the same number of corners as the circuit board (11) also being shaped in a polygon. The advantage of this configuration is that the circuit board (11) may be located very close to the inner protecting wall portion (8). However, in a presently preferred embodiment, the inner protective wall portion (8) has a cylindrical shape which may benefit an accurate proximity to the recessed coupling mechanism (7).

In one embodiment of the invention, the inner protective wall portion (8) is made of a material that reduces heat transfer, such as plastics designed for heat insulation. Such heat transfer may for instance come from the light bulb in the recessed coupling mechanism (7).

In one embodiment of the invention, the inner protective wall portion (8) is made of a construction that reduces electrical interference, such as a substantially sealed construction designed for electrical interference protection. In the present context, "substantially sealed" is given the meaning of sealed with respect to the electrical components (13) on the circuit board (11), allowing openings for connections or the like through the inner protective wall (8). In a preferred embodiment of the invention, the inner protective wall portion (8) is completely surrounding the recessed coupling mechanism (7), except for the opening where the light bulb is to be mounted and openings for connections or the like.

The inner chamber (10) of the housing is relatively small according to preferred embodiments of the present invention. Apart from challenges with conditions such as heat transfer or electrical interference, the small dimensions are also a challenge with respect to functionality of the light socket adapter, such as wireless functionality or sensoring properties. Here, there would need to be space enough for electrical components (13) in the inner chamber (10) and for instance also a surface area of the circuit board (11) that may allow the required quantity of electrical components (13). It was seen to be a huge challenge to the inventors of the present invention to find a solution that fulfilled the various problems that needed to be addressed for a light socket adapter according to the invention to work properly in a relatively small size.

In one embodiment of the invention, the inner chamber (10) has a height (20) measured from the base portion (2) to the end portion (6) that is at least 3 times the width (21) of the inner chamber (10) measured from the inner protective wall (8) to the peripheral outer wall portion (4).

In one embodiment of the invention, the inner chamber (10) has a width (21) measured from the inner protective wall (8) to the peripheral outer wall portion (4) that is at most 10 mm, such as at most 7 mm.

In one embodiment of the invention, the inner chamber (10) has a height (20) measured from the base portion (2) to the end portion (6) that is at most 30 mm, such as at most 25 mm.

In one embodiment of the invention, the inner chamber (10) has a height measured from the base portion (2) to the end portion (6) that is at most the length of the extended coupling mechanism (3).

In one embodiment of the invention, the housing volume is at most 2 times the volume of the extended coupling mechanism (3), such as 1.5 times the volume.

It should be noted that the individual figures in FIG. 1 and FIG. 2 are dimensionally proportional, and that the inner chamber and other features of the light socket adapter according to the invention are illustrated in the presently preferred proportions in FIG. 1 and FIG. 2.

Apart from the relatively small dimensions of the inner chamber (10) of the housing (1), the light socket adapter according to the present invention is also constructed in such a way that it allows enough space for electrical components (13) and the circuit board (11). In terms of the prior art teachings, the present inventors did not predict that it was in fact possible to make such small constructions and at the same time give the light socket adapter functionality, such as wireless functionality or sensing properties. The problems with the shape of the housing were accumulated and the present solution was not expected by the inventors of the present invention.

As is evident from FIG. 1 and FIG. 2, the housing (1) in a preferred embodiment of the invention has a length (25) less than the length of the extended coupling mechanism (3).

The length (25) of the housing (1) illustrated in the figures is 22 mm, the width (30) of the housing (1) is 38 mm and the thickness of the peripheral outer wall portion (4) is 1.2 mm. The extended coupling mechanism (3) as illustrated in the figures is an E27 base that has a length of around 27 mm and a diameter of 27 mm, whereas the recessed coupling mechanism (7) is an E14 base that has a length of around 22 mm and a diameter of 14 mm. In this particular configuration, the light socket adapter is particularly advantageous with respect to various technical effects of the invention. For instance, this configuration allows for space in the inner chamber (10) that fulfills functionality of the light socket adapter of the present invention, such as wireless functionality and sensing functionality.

In one embodiment of the invention, the largest diameter (30) of the peripheral outer wall portion (4) is at most two times the diameter (61) of the extended coupling mechanism (3), such as at most 1.5 times the diameter.

In one embodiment of the invention, the largest diameter (30) of the peripheral outer wall portion (4) is from 1 to 1.5 times the diameter (61) of the extended coupling mechanism (3).

In one embodiment of the invention, the base portion (2) IS circular. In another embodiment of the invention, the end portion (6) is circular.

A circular base portion may be an advantage in order to be better able to mount the extended coupling mechanism (3) in a socket. Also, the light socket adapter would require less space and there would be less risk for electrical contact to the extended coupling mechanism, for instance during mounting. In addition, the shape would be fitted to the general circular shape of light sockets, and thereby it would be possible for the extended coupling mechanism (3) to get deeper into a light socket. Additionally, the shape would allow more available space in the inner chamber of the housing for the circuit board (11) and electrical components (13).

In one embodiment of the invention, the circular end portion (6) having a diameter (35) that is larger than the diameter (36) of the circular base portion (2).

The advantage of having a larger diameter of the circular end portion (6) is that more space is generally available for electrical components (13) in the inner chamber (10) of the housing. Generally, most of the electric components according to the invention would be placed as close to the base portion (2) as possible due to reduced electrical interference where space is more limited. This is relevant for filter components that are required for conductors, microprocessors that may be more vulnerable, and other vulnerable components. However, some components may preferably be placed closer to the end portion (6), such as for instance components behind the tactile bottom (145) or the sensing means that may benefit from incoming air flow.

In one embodiment of the invention, the circular base portion (2) having a diameter (36) of about the same diameter (61) as the extended coupling mechanism (3). This particular embodiment may for instance be applied if the recessed coupling mechanism (7) is small compared to the extended coupling mechanism (3).

In one embodiment of the invention, the peripheral outer wall portion (4) forms a conical shape increasing in diameter from the circular base portion (2) to the circular end portion (6). The great advantage with the conical shape having a base portion (2) with relatively small diameter is that the light socket adapter may easier be mounted in a light socket. It would also require less space and there would be less risk for electrical contact to the extended coupling mechanism (3), for instance during mounting. In addition, the shape would be fitted to the general circular shape of light sockets, and thereby it would be possible for the extended coupling mechanism to get deeper into a light socket. Additionally, the shape would allow more available space in the inner chamber (10) of the housing for the circuit board (11) and electric components (13).

In one embodiment of the invention, the peripheral outer wall portion (4) forms a conical shape increasing at least 1 mm in diameter from the circular base portion (2) to the circular end portion (6), such at least 3 mm in diameter.

In one embodiment of the invention, the peripheral outer wall portion (4) extends in a distance (5) of at most 30 mm being the length (25) of the housing (1).

In one embodiment, the thickness of the peripheral outer wall portion (4) is more than 1.0 mm thick and up to 2.5 mm thick.

In one embodiment of the invention, the housing comprises air openings (40) allowing air to flow into and out of the inner chamber (10) of the housing.

Air openings may be an advantage with respect to heat transfer from the inner chamber (10) due to the relatively small dimensions of the inner chamber where electrical components (13) are present. The electrical components may be affected by heat.

However, air openings may be an even more advantageous embodiment if sensing means are present in the inner chamber (10). Here air openings may allow the sensoring means to monitor ambient conditions, i.e. conditions outside the housing, even inside the housing of the light socket adapter.

In one embodiment of the invention, the housing comprises inlet air openings (41) and outlet air openings (42) allowing air to flow into and out of the inner chamber (10) of the housing.

In one embodiment of the invention, the housing comprises inlet air openings (41) in the base portion (2) of the housing or in the peripheral outer wall portion (4) near the base portion. This construction may give better convection properties if for instance more heat is present in the area of the end portion (6) compared to the base portion (2), such as if a light bulb generates heat near the end portion.

In one embodiment of the invention, the housing comprises outlet air openings (42) in the end portion (6) of the housing or in the peripheral outer wall portion (4) near the end portion. This construction may give better convection properties if for instance more heat is present in the area of the end portion (6) compared to the base portion (2), such as if a light bulb generates heat near the end portion.

In one embodiment of the invention, the housing comprises at least 4 inlet air openings (41) and at least 4 outlet air openings (42). According to the invention, there may be numerous air openings, such as more than 20 or more than 30 outlet air openings.

In one embodiment of the invention, the air openings, such as the outlet air openings (42), are less than 1 mm in diameter. In a preferred embodiment the air openings are 0.9 mm in diameter.

In one embodiment of the invention, the air openings, such as the inlet air openings (41), are elongated openings having a width of less than 1 mm, such as 0.9 mm, and a length of up to 10 mm, such as up to 5 mm.

In one embodiment of the invention, the inner chamber (10) of the housing comprises one or more ambient sensoring means (135-137—shown in FIG. 6).

The advantage of ambient sensoring means in the housing is that the light socket adapter according to the invention is provided with more functionality and intelligence. For instance, the sensoring means may comprise temperature, humidity, sound intensity and/or light intensity sensoring means.

In one embodiment of the invention, the sensoring means (135-137—shown in FIG. 6) is connected with the microprocessor (12—shown in FIG. 6 and FIG. 7) and when data from the sensoring means is received, the microprocessor will process the data and transmit commands based on this data. This may either be done directly back to other operating units of the light socket adapter in which case the light socket adapter may work in an autonomous way without commands from external means, or be done to external means that controls the light socket adapter.

One example of autonomous control is when commands are transmitted by the microprocessor (12—shown in FIG. 6 and FIG. 7) based on settings in a memory storage means on the circuit board (11) of the light socket adapter, such as a flash memory unit (150—shown in FIG. 6). In such case, the microprocessor may send commands directly to a switch or via a light control processor to a switch and for instance control light settings to the recessed coupling mechanism (7) based on settings in the memory storage means. If for instance data from a light intensity sensing means or a sound intensity sensoring means exceeds a threshold value in the settings, the light may be adjusted.

The autonomous operation of the light socket adapter as exemplified above is seen as a particular advantage of the present invention.

In another example, if data is received from a sound intensity sensoring means, the microprocessor (12) may send commands directly to a releasable emitting module (14) on the light socket adapter based on settings.

In these ways, the light socket adapter is provided with more functionality and intelligence. For instance, light settings may be operated independently and autonomous when settings are provided to the light socket adapter. This is seen as a great advantage of the present invention.

In some other embodiments, commands based on data from the sensoring means are transmitted from the microprocessor (12) to external processing means, which may subsequently control ambient conditions, such as ambient humidity or temperature conditions. Data may also be transmitted to external means that controls the light settings in the light socket adapter, or data may be transmitted to means that otherwise react on the data, such as sound emitting means, for instance in a geofencing application.

In the present context "ambient" refers to conditions outside the housing of the light socket adapter. Hence, conditions are detected inside the housing according to the present invention, but measured as outside "ambient" conditions. In some cases, the data from the sensoring means is to be converted to reflect outside "ambient" conditions, such as temperature or humidity data. In that case, an algorithm may be applied. In other cases, the data may not need further conversions, such as for sound intensity data.

Another way to receive "ambient" data from outside the housing according to the invention by means of the sensoring means inside the housing is to have air opening (40) according to the invention in the wall of the housing (1). In this case, an air flow may offer conditions inside the housing that reflect conditions outside the housing. However, additional conversion may be required to get the values from outside the housing according to some embodiments of the invention.

The sensing means may be placed in the peripheral outer wall portion (4) or in a preferred embodiment on the circuit board (11) in the housing. In order to protect the sensoring means it may be beneficial with a location on the circuit board. However, the sensoring means may also be placed in the peripheral outer wall portion where it for instance may detect conditions directly from the outside by means of an opening in the peripheral outer wall portion. Since the sensoring means may be vulnerable with respect to various external conditions, such as mechanical stress, it would be an advantage with the sensoring means located on the circuit board (11) inside the housing (1).

In one embodiment of the invention, the sensoring means is connected to the at least one microprocessor (12) on the circuit board (11). In this way, the sensoring means may send data to the microprocessor and the data would then be processed further.

In one embodiment of the invention, a microprocessor on the circuit board (11) receives data from the sensoring means and a transmitter transmits commands from the microprocessor to a computing device and/or a remote server system.

This data may be transmitted from the microprocessor to a router and/or a remote server system in a wired connection, such as a power-line communication route. In the alternative, the data may be transmitted from the microprocessor to a router and/or a remote server system in a wireless connection, such as via a Wi-Fi protocol. For instance, data detected by the ambient sensing means will be received by a microprocessor inside the housing of the light socket adapter and transmitted by Wi-Fi to a router, computing device and/or a remote server system. Accordingly, the system may automatically or a user may manually adjust conditions detected by the ambient sensing means, even from a remote location.

In one embodiment of the invention, a microprocessor on the circuit board (11) receives data from the sensing means and a wireless transmitter transmits commands from the microprocessor to a computing device and/or a remote server system.

In one embodiment of the invention, the inner chamber (10) of the housing comprises an ambient humidity sensoring means.

In one embodiment of the invention, the inner chamber (10) of the housing comprises an ambient temperature sensoring means.

In one embodiment of the invention, the inner chamber (10) of the housing comprises an ambient light intensity sensoring means.

In one embodiment of the invention, the inner chamber (10) of the housing comprises an ambient sound intensity sensoring means.

In one embodiment of the invention, the inner chamber (10) of the housing comprises one or more ambient sensoring means in connection with ambient conditions by means of air openings (40) allowing air to flow into and out of the inner chamber of the housing.

In one embodiment of the invention, the recessed coupling mechanism (7) is designed for receiving an LED light bulb. This is a particularly preferred embodiment of the invention.

In one embodiment of the invention, the diameter (60) of the recessed coupling mechanism (7) being at least 30% smaller than the diameter (61) of the extended coupling mechanism (3).

When the recessed coupling mechanism (7) is smaller than the extended coupling mechanism (3), the benefit is more available space in the inner chamber (10) of the housing for electrical components (13) and the circuit board (11). It was not predicted by the inventors of the present invention that it was in fact possible to manufacture a light socket adapter which a relatively small size and at the same time maintain functionality, such as wireless functionality.

In one embodiment of the invention, the diameter (60) of the recessed coupling mechanism (7) being at least 40% smaller than the diameter (61) of the extended coupling mechanism (3).

In one embodiment of the invention, the smaller diameter (60) of the recessed coupling mechanism (7) than the diameter (61) of the extended coupling mechanism (3) allows for more space in the inner chamber (10) of the housing for the circuit board (11) and electrical components (13) compared to a housing with about the same diameter of coupling mechanisms.

In one embodiment of the invention, the recessed coupling mechanism (7) is a screw base, such as an E17, E14 or E12 screw base, and the extended coupling mechanism (3) is a screw base, such as an E27 or E26 screw base.

In one embodiment of the invention, the recessed coupling mechanism (7) is a screw base and the extended coupling mechanism (3) is a bayonet base, such as a B22D bayonet base.

In one embodiment of the invention, the recessed coupling mechanism (7) is a screw base and the extended coupling mechanism (3) is a bi-pin base, such as a GU10 bi-pin base.

In FIG. 1 and FIG. 2 it is indicated that the light socket adapter according to the invention may have a releasable module (14) at the outside surface of the peripheral outer wall portion.

Figure 3:
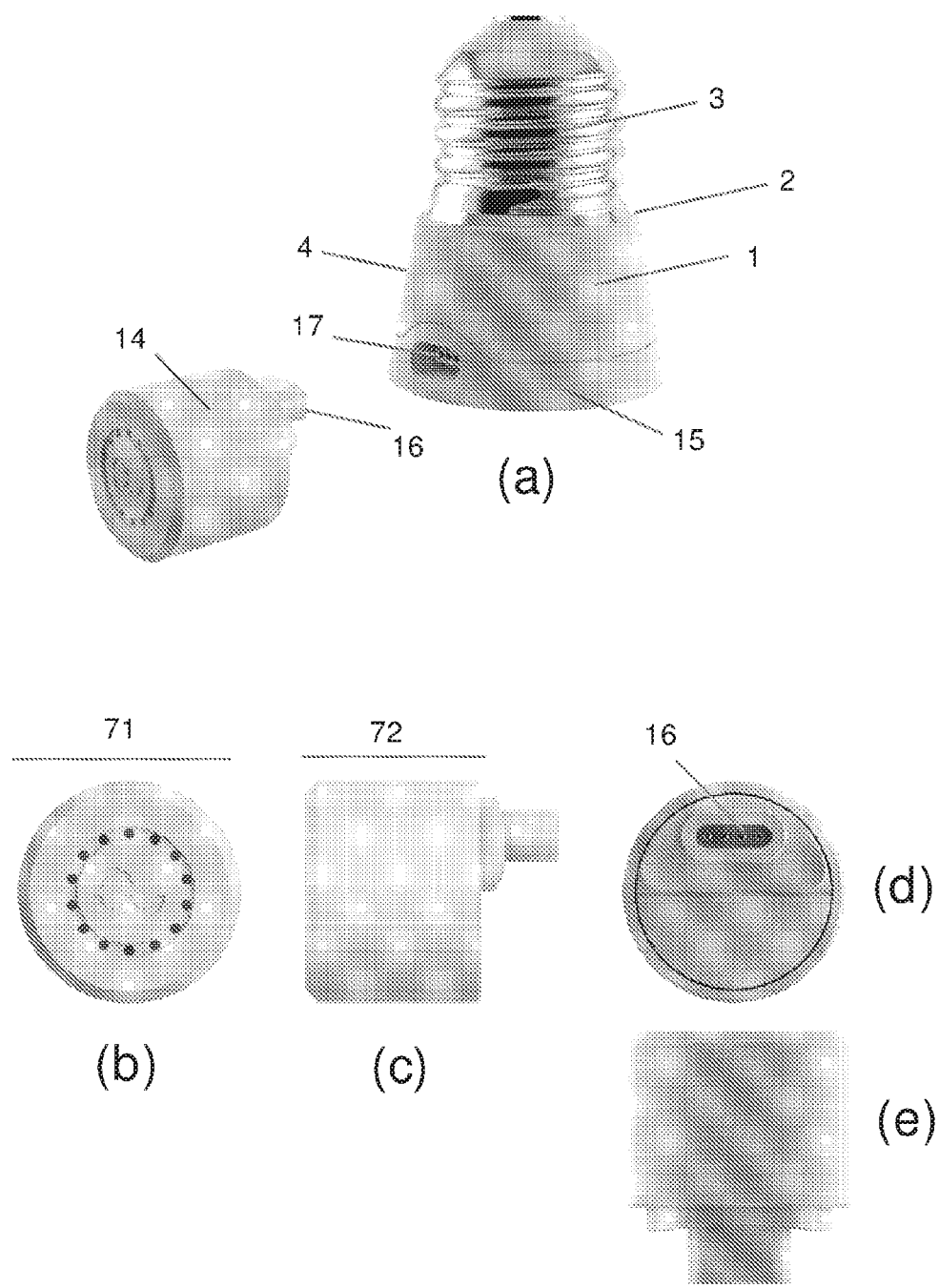
FIG. 3: A photo illustrating a light socket adapter with a releasable module not mounted to the light socked adapter (a), a releasable module seen from the front (b), a releasable module seen from the right side (c), a releasable module seen from the back (d), and a releasable module seen from the top (e).

Now turning to FIG. 3, a picture of the releasable module is illustrated.

In one embodiment of the invention, the housing (1) is mounted with at least one releasable module (14) at the outside surface (15) of the peripheral outer wall portion (4) that receives power supply from the extended coupling mechanism (3), such as a releasable communication module.

As it appears from FIG. 3 the releasable module is connected to the housing of the light socket adapter via a male connecter (16) to a female mechanism (17) that receives the male connecter. In this way the releasable module may be connected to the light socket adapter, giving the light socket adapter further functionality. The releasable module receives power supply from the extended coupling mechanism (3) in order to work as intended. Various types of releasable modules may be used according to the present invention. This gives the user a choice of different options that fulfill a tailored need for functionality.

A great advantage of the releasable module is that it may contribute to the overall functionality of the light socket adapter, providing the light socket adapter with further intelligence. For instance the sensing means may provide data that is processed and transmitted to the releasable module for further operation, such as for instance when sound intensity data is detected by the sensing means and a releasable sound emitting module operates according to settings.

In one embodiment of the invention, the releasable module (14) is connected with the microprocessor (12—shown in FIG. 6 and FIG. 7) and when data from the releasable module is received, the microprocessor will process the data and transmit commands based on this data. This may either be done directly back to other operating units of the light socket adapter based on settings in a memory storage means in which case the light socket adapter may work in an autonomous way without commands from external means, or be done to external means that control the light socket adapter.

One example of autonomous control is when commands are transmitted by the microprocessor (12—shown in FIG. 6 and FIG. 7) based on settings in a memory storage means on the circuit board (11) of the light socket adapter, such as a flash memory unit (150—shown in FIG. 6).

The autonomous operation of the light socket adapter as exemplified above is seen as a particular advantage of the present invention.

According to the invention, there may be more than one female mechanism (17) that receive the male connecter, such as 2, 3 or 4 female mechanisms (17) that receive 2, 3 or 4 male connecters (16).

In one embodiment of the invention, the housing is mounted with at least one releasable module (14) at the outside surface (15) of the peripheral outer wall portion (4) closer to the end portion (6) than the base portion (2).

In one embodiment of the invention, the housing is mounted with at least one releasable module (14) connected to the circuit board (11) through the peripheral outer wall portion (4).

In one embodiment of the invention, a microprocessor on the circuit board (11) receives data or commands from the releasable module (14), and a transmitter transmits commands from the microprocessor to a remote server system and/or a mobile computing device.

In one embodiment of the invention, the at least one releasable module (14) having a circular body with a size of less than 25 mm in diameter (71) and 20 mm in height (72), such as at most 20 mm in diameter and 15 mm in height.

In one embodiment of the invention, the releasable module (14) is a carbon dioxide detecting module. In one embodiment of the invention, the releasable module (14) is a radon detecting module. In one embodiment of the invention, the releasable module (14) is a sound emitting unit. In one embodiment of the invention, the releasable module (14) is a cellular 3/4/5 G module. In one embodiment of the invention, the releasable module (14) is a ZigBee module. In one embodiment of the invention, the releasable module (14) is a Z-wave module. In one embodiment of the invention, the releasable module (14) is a wireless extender module.

In one embodiment of the invention, the releasable module (14) comprises at least one capacitor or at least one rechargeable battery for powering repetition of a signal temporarily when power is turned off.

Returning now to FIG. 1 and FIG. 2 it is seen that the circuit board (11) is located in the inner chamber (10) of the light socket adapter.

In one embodiment of the invention, the circuit board (11) is arranged within the inner chamber (10) in close proximity to the inner protective wall (8). By "close proximity" is meant that the circuit board is placed within a few millimeters from the inner protective wall or at least as close as possible to the inner protective wall as possible. The benefit is that the space in the inner chamber is used best possible and that the components (13) on the circuit board (11) are given enough space in the inner chamber (10) of the light socket adapter.

Figure 4:
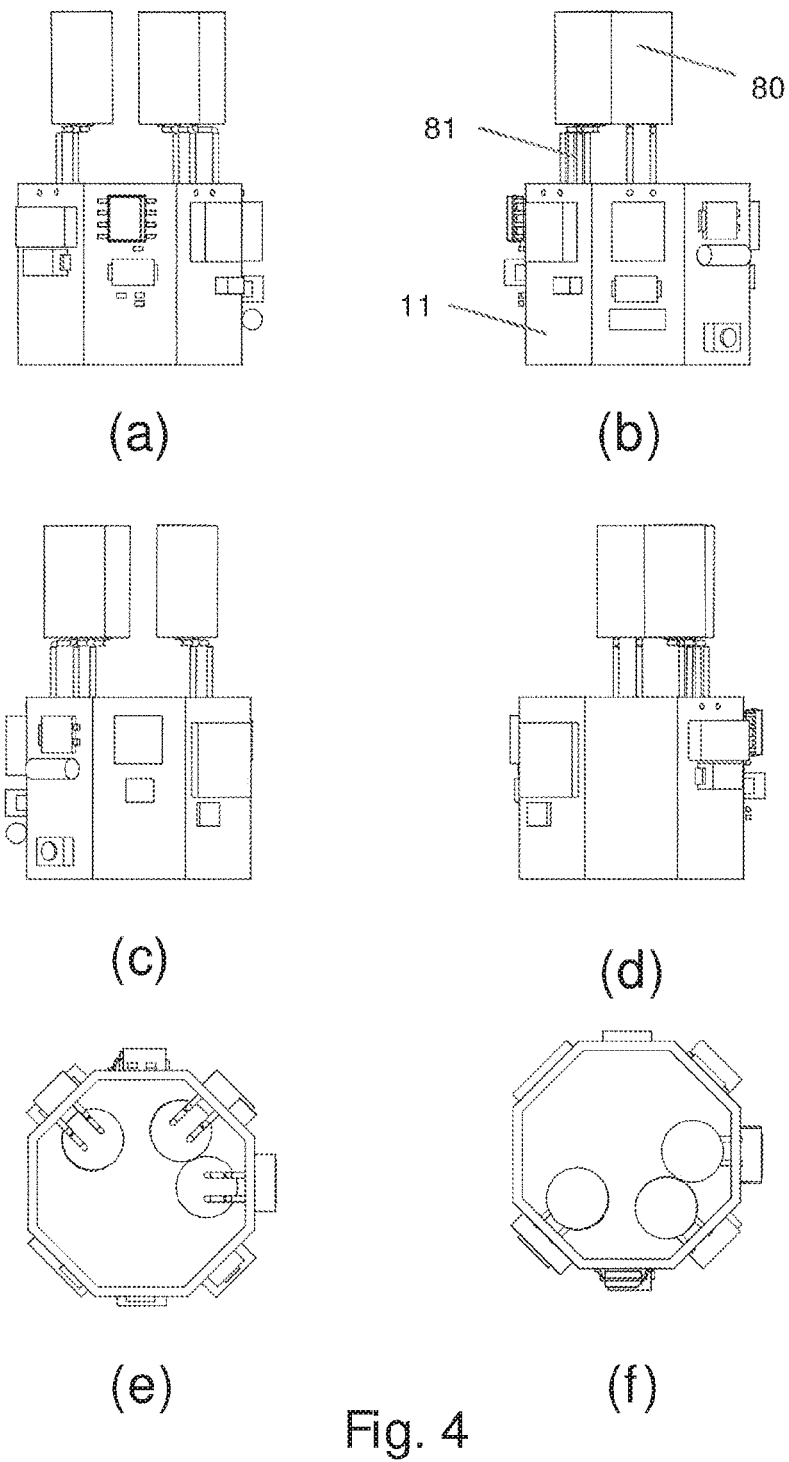
FIG. 4: A circuit board of the light socket adapter, which has been taken out of the light socket adapter for illustration purposes, seen from the front (a), a circuit board seen from the right side (b), a circuit board seen from the back (c), a circuit board seen from the left side (d), a circuit board seen from the bottom (e), and a circuit board seen from the top (f).
Figure 5:
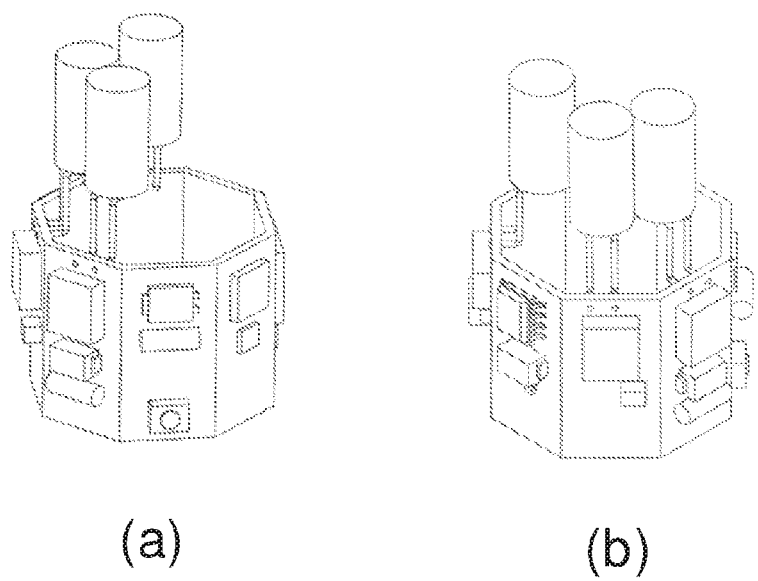
FIG. 5: A circuit board of the light socket adapter, which has been taken out of the light socket adapter for illustration purposes, seen from an upper angle in a back to right side view (a), and a circuit board seen from an upper angle in a front to right side view (b).

Now turning to FIG. 4 and FIG. 5 an illustration of a preferred configuration of the circuit board is shown.

In one embodiment of the invention, the circuit board (11) is arranged within the inner chamber (10) as a number of connected circuit boards configured in a polygon in close proximity to and surrounding the inner protective wall (8).

The polygon may be configured of separate circuit boards that are fastened to each other side by side as shown in FIG. 4 and FIG. 5 where the separate circuit boards are electrically connected to each other. In the alternative and in a preferred embodiment, the separate circuit boards are electrically connected to each other by means of flexible portions (90) as shown in FIG. 6. The flexible portions are particularly advantageous in the present context due to the small size of the system and allow for a very high surface area of the circuit board (11). Additionally, the flexible portions make it possible to configure the separate circuit boards in an assembly of a complete circuit board (11). Flexible circuit boards are also known as flex-rigid systems.

In one embodiment of the invention, the circuit board (11) is arranged within the inner chamber (10) as a number of connected circuit boards configured in a heptagon or octagon in close proximity to and surrounding the inner protective wall (8).

The advantage of a heptagon or octagon is that the area of the circuit board is maximized and at the same time fitted to allow for best possible space for the electrical components (13) on the circuit board (11) in the inner chamber (10) of the housing.

In one embodiment of the invention, the circuit board (11) is arranged within the inner chamber (10) as a number of connected rectangular circuit boards configured in a regular polygon in close proximity to and surrounding the inner protective wall (8). The benefit of a regular polygon is that the available space for electrical components in the housing is maximized.

In one embodiment of the invention, the circuit board (11) is arranged within the inner chamber (10) as a number of connected regular circuit boards configured in a regular heptagon or octagon in close proximity to and surrounding the inner protective wall (8).

In one embodiment of the invention, the total surface area of the circuit board (11) is at least 800 square millimeters, such as at least 1000 square millimeters, such as at least 1200 square millimeters. In a preferred embodiment of the invention the circuit board is about 1200 square millimeters.

Specifically, it was not predicted by the inventors of the present invention that a circuit board of this size was possible to combine with the relatively small size of the light socket adapter without losing functionality. The configuration was a surprise to the inventors of the present invention and not expected to work in a light socket adapter of this relatively small size.

In one embodiment of the invention, the circuit board (11) comprises a circuit including power supply components. The preferred light bulb according to the invention is an LED light bulb.

Specifically, power supply components both require a large circuit board area and space enough for the individual components in the light socket adapter. This is usually a limiting factor in providing relatively small light socket adapters. However, this problem is solved my means of the circuit board according to the invention.

In one embodiment of the invention, the power supply components in the circuit board (11) comprise a number of capacitors (SO), such as 3 capacitors. The power supply also requires additional components, such as a coil and filters. A person of ordinary skill in the art would know what is required to supply the system according to the invention.

In one embodiment of the invention, at least 2 capacitors (SO), such as at least 3, are located in a cavity of the extended coupling mechanism (3) by means of connections (SI) to the circuit board (11) in the housing. The benefit of this configuration is to allow a relatively small light socket adapter, which would not be possible with the required size of capacitors. In a preferred embodiment of the invention, three capacitors are located in the cavity of the excessed coupling mechanism together with 1 coil, and filters for each capacitor are located in the upper part of the circuit board (11) close to the capacitors and coil.

In one embodiment of the invention, the recessed coupling mechanism (7) IS designed to accept one of a CFL, LED, halogen or incandescent light bulb.

Now turning to FIG. 6 a heptagon flex-rigid circuit board is illustrated in an outfolded position with some of the most pronounced electrical components according to a preferred embodiment of the invention.

The individual circuit boards illustrated in FIG. 6 are 19.2 mm in length and 9.3 mm in width, given the particular circuit board a total surface area of about 1250 square millimeters. The circuit board illustrated consists of 7 individual circuit boards.

From the bottom of FIG. 6, the three first individual circuit boards comprise power supply units (146). The fourth individual circuit board comprises a Bluetooth low energy unit (144) which is 5 times 5 millimeters, a temperature and humidity sensor unit (135) which is 2 times 2 millimeters, and a sound intensity sensor unit (136) which is 2 times 4 millimeters. Circuit board number 5 comprises a microprocessor (12) which in this case is a wireless network processor unit of 8 times 8 millimeters, as well as a flash memory unit (150) of 5 times 3 millimeters. Circuit board number 6 comprises a light control processor (120), a light intensity sensor (137) of 2 times 2 millimeters and a tactile button component for pairing (145) which is 4 times 2 millimeters. Circuit board number 7 comprises a power supply and AC switch (140).

In one embodiment of the invention, the circuit board (11) comprises at least one microprocessor (12), at least one light control processor (120) and at least one power supply and AC switch (140).

In one embodiment of the invention, the circuit board (11) comprises at least one microprocessor (12), at least one light control processor (120), at least one power supply and AC switch (140) and at least one flash memory unit (150). Other combinations of components from FIG. 6 is within the scope of the present invention Now turning to FIG. 7, the circuits according to a preferred embodiment of the invention is illustrated.

FIG. 7 illustrates a microprocessor (12) which in this case is a wireless network processor comprising a wireless receiver (WiFi-RX) and a wireless transmitter (WiFi-TX) that receives and transmits commands wirelessly via an antenna (110).

The wireless network processor communicates by means of the wireless receiver and transmitter with a light control processor unit (120) via a receiver (RX) and a transmitter (TX) in the light control processor. The wireless network processor unit processes information input from and output to other components in the system and works as a main processor. It outputs desired light intensity commands to the light control processor (120) via light controlling lines (LI). Also the wireless network processor receives data from a first sensor (135) and a second sensor (136) and a further sensor (137—shown in FIG. 7) via an outgoing line in the sensors (SO) and an ingoing line in the wireless network processor (SI).

The wireless network processor unit, the light control processor unit (120) and the sensors (135-137) are power supplied (3V3) by a power supply and AC switch (140) via a positive voltage power supply pin (VCC) and grounded (GND). Additional components in the system are also power supplied by this unit.

The light control processor unit (120) controls the light (ACS-CONTROL) in the light bulb mounted in the recessed coupling mechanism (7) by controlling power to the recessed coupling mechanism, in this case mounted with an E 14 LED light bulb, after commands are received via controlling lines (LI) from the wireless network processor unit.

The power supply and AC switch (140) connects and directs power from the mains via the extended coupling mechanism (7, E27) to the recessed coupling mechanism (3, E14) and also converts AC high voltage (230V) to DC low voltage (3,3V). The current and voltage between the power supply and the AC switch unit (140) and the light control processor (120) are sensed (CUR_SENSE and VOLT_SENSE). When receiving commands from the light control processor, the power may be adjusted to the recessed coupling mechanism via a switch (SWITCHED_NEUTRAL), such as if the light intensity in the light bulb is to be reduced.

In one embodiment of the invention, the wireless light socket adapter comprises at least one wireless receiver, such as at least two wireless receivers.

The wireless receiver may be comprised in the microprocessor unit (12) which presently is preferred, optionally together with a wireless transmitter. In other embodiments, the wireless receiver is a separate unit, separated from the microprocessor (12).

In one embodiment of the invention, the wireless light socket adapter comprises at least one wireless transmitter, such as at least two wireless transmitters.

In one embodiment of the invention, the wireless receiver requires a surface area on the circuit board (11) of at least 25 square millimeters, such as at least 50 square millimeters, such as at least 75 square millimeters. In a preferred embodiment, the wireless receiver is about 80 square millimeters.

In one embodiment of the invention, the at least one wireless receiver is included in at least one Wi-Fi connectivity circuit.

In one embodiment of the invention, the Wi-Fi connectivity circuit is based on commands in the protocol IEEE 802.11.

In one embodiment of the invention, the light socket adapter comprises at least one Bluetooth LE circuit. In one embodiment of the invention, the at least one Bluetooth LE circuit is used for pairing a computing device with the light socket adapter, and the surface of the housing comprises a pairing bottom (145). In the alternative, pairing is conducted with a Wi-Fi protocol.

In one embodiment of the invention, the wireless light socket adapter comprises a microprocessor that is included in a circuit receiving commands from a wireless receiver and the circuit further comprising a switching mechanism coupled to the microprocessor that controls the application of power to the recessed coupling mechanism by receiving commands from the microprocessor.

In one embodiment of the invention, the wireless light socket adapter comprises a microprocessor that is included in a circuit receiving commands from a wireless receiver and the circuit further comprising a wireless transmitter that transmits commands from the microprocessor and repeating a signal.

In one embodiment of the invention, a memory storage means is comprised in a circuit that stores settings and commands.

In one embodiment of the invention, a memory storage means is comprised in a circuit that stores settings and commands when the power to the adapter is turned on.

In one embodiment of the invention, a memory storage means is comprised in a circuit that stores settings and commands when the power to the adapter is turned off.

In one embodiment of the invention, the memory storage means is a flash memory unit (150).

In one embodiment of the invention, the housing comprises a temporary power supply for powering repetition of a signal temporarily when power is turned off.

In one embodiment of the invention, the housing comprises at least one capacitor or at least one rechargeable battery for powering repetition of a signal temporarily when power is turned off.

Figure 8:
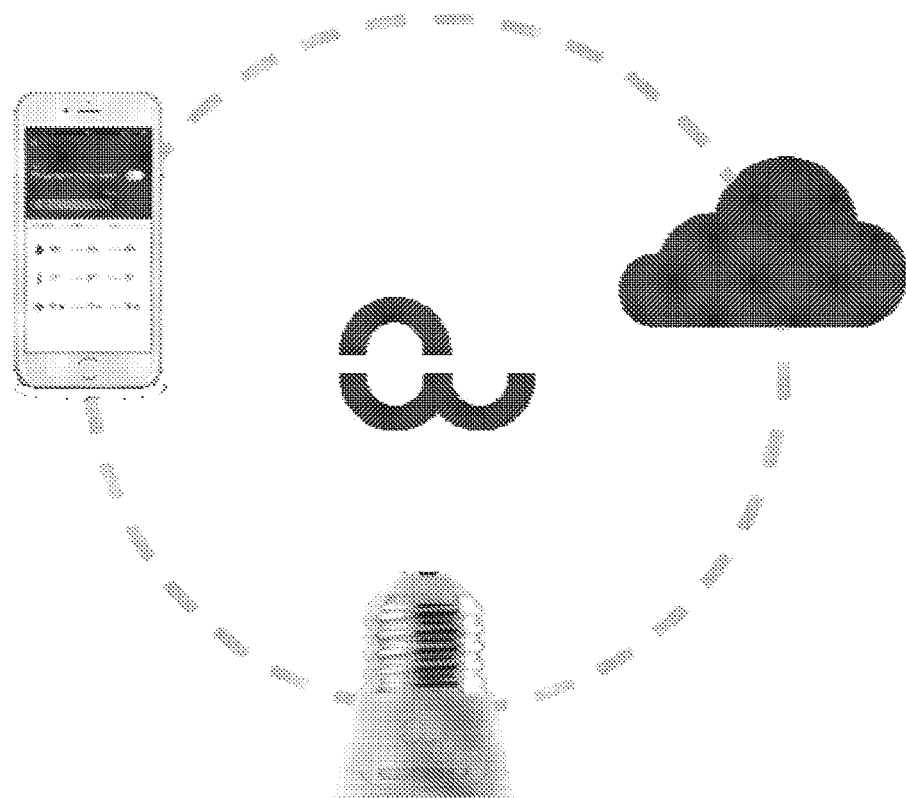
FIG. 8: Illustration of an integrated system for connectivity control.

Now turning to FIG. 8 there is shown an integrated system for connectivity control between a mobile device, a light socket adapter according to the invention and the cloud.

In one embodiment of the invention, the integrated system comprises a light socket adapter; at least one computing device wirelessly coupled to the light socket adapter; and optionally at least one remote server system. While the computing device is wireless coupled to the light socket adapter, the light socket adapter in one embodiment may communicate in a wired connection, such as in a power-line communication, to a router which again may be wired to at least one remote server system. However, in a preferred embodiment exchange of commands is via wireless communication between the light socket adapter, the at least one computing device and the router.

In one embodiment of the invention, the integrated system for wireless connectivity control comprises a wireless light socket adapter; at least one computing device wirelessly coupled to the light socket adapter; and optionally at least one remote server system wirelessly coupled to the light socket adapter.

In one embodiment of the invention, the wireless light socket adapter and the at least one computing device and/or the at least one remote server system are wirelessly interconnected and exchange settings and commands.

In one embodiment of the invention, the wireless light socket adapter comprises a memory storage means that stores settings and commands received from the at least one computing device and/or the at least one remote server system.

In one embodiment of the invention, a plurality of light socket adapters are wirelessly coupled to each other by means of repeating signals between the light socket adapters, such as in a mesh network.

In one embodiment of the invention, the wireless light socket adapter comprises one or more ambient sensing means, and transmits commands in a wireless coupling to the at least one computing device and/or the at least one remote server system.

In one embodiment of the invention, the at least one computing device and/or the at least one remote server system further transmits commands in a wireless coupling to an external control means, such as an external heating or cooling means.

In one embodiment of the invention, the light socket adapter transmits commands in a wireless coupling to the at least one computing device and/or the at least one remote server system.

In one embodiment of the invention, the at least one computing device and/or the at least one remote server system transmits commands or settings in a wireless coupling to the wireless light socket adapter for controlling light settings.

In one embodiment of the invention, the light settings are one or more from disabling power to the light bulb, enabling power to the light bulb, reduce power to the light bulb to produce a dimming effect, and increase power to the light bulb to increase brightness.

In one embodiment of the invention, the remote server system transmits settings for a lighting scheme to the wireless light socket adapter module, wherein the lighting scheme is user dependent.

One skilled in the art will appreciate that many variations are possible within the scope of the present invention. Thus, while the invention has been particularly shown and described with reference to the figures, it will be understood by those skilled in departing from the spirit and scope of the invention.

APPENDIX OF DISCLOSED ASPECTS AND EMBODIMENTS

1. A light socket adapter comprising a housing having a base portion mounted centrally with an extended coupling mechanism designed for insertion into an electrical light socket support, a peripheral outer wall portion extending in a distance from the base portion to an end portion, the end portion centrally arranged with a recessed coupling mechanism designed for receiving a light bulb; the housing having an inner protective wall portion that substantially surrounds and is in close proximity with the inner surface of the recessed coupling mechanism; the peripheral outer wall portion and inner protective wall portion defining an inner chamber of the housing comprising at least one circuit board including at least one microprocessor, at least one receiver and at least one transmitter; the inner chamber of the housing comprises one or more ambient sensing means.

2. The light socket adapter according to aspect 1, wherein the circuit board comprises at least one wireless receiver and at least one wireless transmitter.

3. The light socket adapter according to aspect 1 or 2, wherein the microprocessor on the circuit board receives data from the sensing means and a wireless transmitter transmits commands from the microprocessor to a computing device and/or a remote server system.

4. The light socket adapter according to any of the preceding aspects, wherein the inner chamber of the housing comprises one or more ambient sensing means in connection with ambient conditions by means of air openings allowing air to flow into and out of the inner chamber of the housing.

5. The light socket adapter according to any of the preceding aspects, wherein the housing comprises air openings allowing air to flow into and out of the inner chamber of the housing.

6. The light socket adapter according to any of the preceding aspects, wherein the housing comprises inlet air openings and outlet air openings allowing air to flow into and out of the inner chamber of the housing.

7. The light socket adapter according to any of the preceding aspects, wherein the housing comprises inlet air openings in the base portion of the housing or in the peripheral outer wall portion near the base portion.

8. The light socket adapter according to any of the preceding aspects, wherein the housing comprises outlet air openings in the end portion of the housing or in the peripheral outer wall portion near the end portion.

9. The light socket adapter according to any of the preceding aspects, wherein the housing comprises at least 4 inlet air openings and at least 4 outlet air openings.

10. The light socket adapter according to any of the preceding aspects, wherein the air openings, such as the outlet air openings, are less than 1 mm in diameter.

11. The light socket adapter according to any of the preceding aspects, wherein the air openings, such as the inlet air openings, are elongated openings having a width of less than 1 mm and a length of up to 10 mm, such as up to 5 mm.

12. The light socket adapter according to any of the preceding aspects, wherein the inner chamber of the housing comprises an ambient humidity sensing means.

13. The light socket adapter according to any of the preceding aspects, wherein the inner chamber of the housing comprises an ambient temperature sensing means.

14. The light socket adapter according to any of the preceding aspects, wherein the inner chamber of the housing comprises an ambient light intensity sensing means.

15. The light socket adapter according to any of the preceding aspects, wherein the inner chamber of the housing comprises an ambient sound intensity sensing means.

16. The light socket adapter according to any of the preceding aspects, wherein the inner chamber has a height measured from the base portion to the end portion that is at least 3 times the width measured from the inner protective wall to the peripheral outer wall portion.

17. The light socket adapter according to any of the preceding aspects, wherein the inner chamber has a height measured from the base portion to the end portion that is at most 30 mm, such as at most 25 mm.

18. The light socket adapter according to any of the preceding aspects, wherein the largest diameter of the peripheral outer wall portion is at most 1.5 times the diameter of the extended coupling mechanism.

19. The light socket adapter according to any of the preceding aspects, wherein the peripheral outer wall portion forms a conical shape increasing in diameter from the circular base portion to the circular end portion.

20. The light socket adapter according to any of the preceding aspects, wherein the recessed coupling mechanism is designed for receiving an LED light bulb.

21. The light socket adapter according to any of the preceding aspects, wherein the diameter of the recessed coupling mechanism being at least 30% smaller than the diameter of the extended coupling mechanism.

22. The light socket adapter according to any of the preceding aspects, wherein the diameter of the recessed coupling mechanism being at least 40% smaller than the diameter of the extended coupling mechanism.

23. The light socket adapter according to any of the preceding aspects, wherein the recessed coupling mechanism is a screw base and the extended coupling mechanism is a screw base.

24. The light socket adapter according to any of the preceding aspects, wherein the recessed coupling mechanism is an E17, E14 or E12 screw base and the extended coupling mechanism is an E27 or E26 screw base.

25. The light socket adapter according to any of the preceding aspects, wherein the housing is mounted with at least one releasable module at the outside surface of the peripheral outer wall portion that receives power supply from the extended coupling mechanism, such as a releasable communication module.

26. An integrated system for connectivity control, comprising a light socket adapter according to any of the preceding aspects; at least one computing device wirelessly coupled to the light socket adapter; and optionally at least one remote server system.

27. The system according to aspect 26, wherein the light socket adapter and the at least one computing device and/or the at least one remote server system are wirelessly interconnected and exchange settings and commands.

28. The system according to aspect 26 or 27, wherein the light socket adapter comprises a memory storage means that stores settings and commands received from the at least one computing device and/or the at least one remote server system.

29. The system according to any of aspects 26 to 28, wherein the light socket adapter transmits commands in a wireless coupling to the at least one computing device and/or the at least one remote server system.

30. The system according to any of aspects 26 to 29, wherein the at least one computing device and/or the at least one remote server system further transmits commands in a wireless coupling to an external control means, such as an external heating or cooling means.

31. The system according to any of aspects 26 to 30, wherein the at least one computing device and/or the at least one remote server system transmits commands or settings in a wireless coupling to the light socket adapter.

The invention claimed is:

1. A light socket adapter, comprising:
   a housing, including:
      a circular base portion centrally mounted with an extended coupling mechanism operable to insert into an electrical light socket support, the extended coupling mechanism extending from the circular base portion in an outward direction relative to the circular base portion;
      a peripheral outer wall portion extending a distance from the circular base portion to a circular end portion, wherein a diameter of the peripheral outer wall portion is less than or equal to 1.5 times a diameter of the extended coupling mechanism, and wherein the circular end portion is centrally arranged with a recessed coupling mechanism operable to receive a light bulb;
      an inner protective wall portion that substantially surrounds and is in close proximity with an inner surface of the recessed coupling mechanism; and
      an inner chamber defined by the peripheral outer wall portion and the inner protective wall portion, wherein the inner chamber comprises a circular volume enclosed inside the housing of the light socket adapter, and wherein the inner chamber includes:
         at least one circuit board including at least one microprocessor, at least one wireless receiver and at least one wireless transmitter, and
         one or more internal sensing means, positioned within the inner chamber, configured to monitor conditions outside the light socket adapter.

2. The light socket adapter of claim 1, wherein the one or more internal sensing means of the inner chamber of the housing include an internal temperature sensing means.

3. The light socket adapter of claim 1, wherein the at least one microprocessor of the circuit board is configured to receive data from the one or more internal sensing means, and wherein the wireless transmitter is configured to transmit commands from the at least one microprocessor to a computing device and/or a remote server system.

4. The light socket adapter of claim 1, wherein the housing further includes air openings operable to allow air to flow into and out of the inner chamber of the housing.

5. The light socket adapter of claim 1, wherein the housing further includes inlet air openings and outlet air openings operable to allow air to flow into and out of the inner chamber of the housing.

6. The light socket adapter of claim 1, wherein the housing further includes inlet air openings in the circular base portion of the housing or in the peripheral outer wall portion near the circular base portion.

7. The light socket adapter of claim 1, wherein the housing further includes outlet air openings in the circular end portion of the housing or in the peripheral outer wall portion near the circular end portion.

8. The light socket adapter of claim 1, wherein the housing further includes air openings that are less than 1 mm in diameter.

9. The light socket adapter of claim 1, wherein the housing further includes air openings that are elongated openings including a width of less than 1 mm and a length of up to 10 mm.

10. The light socket adapter of claim 1, wherein the one or more internal sensing means of the inner chamber of the housing include an internal humidity sensing means.

11. The light socket adapter of claim 1, wherein the one or more internal sensing means of the inner chamber of the housing include an internal light intensity sensoring means.

12. The light socket adapter of claim 1, wherein the one or more internal sensing means of the inner chamber of the housing include an internal sound intensity sensoring means.

13. The light socket adapter of claim 1, wherein the inner chamber has a height measured from the circular base portion to the circular end portion that is at least 3 times the width measured from the inner protective wall portion to the peripheral outer wall portion.

14. The light socket adapter of claim 1, wherein the inner chamber has a height measured from the circular base portion to the circular end portion that is at most 30 mm.

15. The light socket adapter of claim 1, wherein the peripheral outer wall portion forms a conical shape increasing in diameter from the circular base portion to the circular end portion.

16. The light socket adapter of claim 1, wherein a diameter of the recessed coupling mechanism is at least 30% smaller than a diameter of the extended coupling mechanism.

17. The light socket adapter of claim 1, wherein the recessed coupling mechanism is a screw base and the extended coupling mechanism is a screw base.

18. A light socket adapter, comprising:
a housing, including:
a circular base portion centrally mounted with an extended coupling mechanism operable to insert into an electrical light socket support, the extended coupling mechanism extending from the circular base portion in an outward direction relative to the circular base portion;
a peripheral outer wall portion extending a distance from the circular base portion to a circular end portion, wherein a diameter of the peripheral outer wall portion is less than or equal to 1.5 times a diameter of the extended coupling mechanism, and wherein the circular end portion is centrally arranged with a recessed coupling mechanism operable to receive a light bulb;
an inner protective wall portion that substantially surrounds and is in close proximity with an inner surface of the recessed coupling mechanism; and
an inner chamber defined by the peripheral outer wall portion and the inner protective wall portion, wherein the inner chamber comprises a circular volume enclosed inside the housing of the light socket adapter, and wherein the inner chamber includes:
at least one circuit board including at least one microprocessor, at least one wireless receiver and at least one wireless transmitter, and
an internal sound intensity sensoring means, positioned within the inner chamber, configured to monitor conditions outside the light socket adapter.

19. A light socket adapter, comprising:
a housing, including:
a circular base portion centrally mounted with an extended coupling mechanism operable to insert into an electrical light socket support, the extended coupling mechanism extending from the circular base portion in an outward direction relative to the circular base portion;
a peripheral outer wall portion extending a distance from the circular base portion to a circular end portion, wherein a diameter of the peripheral outer wall portion is less than or equal to 1.5 times a diameter of the extended coupling mechanism, and wherein the circular end portion is centrally arranged with a recessed coupling mechanism operable to receive a light bulb;
an inner protective wall portion that substantially surrounds and is in close proximity with an inner surface of the recessed coupling mechanism;
an inner chamber of the housing defined by the peripheral outer wall portion and inner protective wall portion, wherein the inner chamber comprises a circular volume enclosed inside the housing of the light socket adapter, and wherein the inner chamber includes:
at least one circuit board including at least one microprocessor, at least one wireless receiver and at least one wireless transmitter,
one or more internal sensing means, positioned within the inner chamber, configured to monitor conditions outside the light socket adapter, and
air openings operable to allow air to flow into and out of the inner chamber of the housing.

20. The light socket adapter of claim 19, wherein the air openings include inlet air openings in the circular base portion of the housing or in the peripheral outer wall portion near the circular base portion, and outlet air openings in the circular end portion of the housing or in the peripheral outer wall portion near the circular end portion.

* * * * *